United States Patent
Han

(10) Patent No.: US 12,150,001 B2
(45) Date of Patent: Nov. 19, 2024

(54) METHOD AND DEVICE FOR TRIGGERING CELL RESELECTION, STORAGE MEDIUM, AND USER TERMINAL

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 544 days.

(21) Appl. No.: 17/427,337

(22) PCT Filed: Jan. 8, 2020

(86) PCT No.: PCT/CN2020/070858
§ 371 (c)(1),
(2) Date: Jul. 30, 2021

(87) PCT Pub. No.: WO2020/156066
PCT Pub. Date: Aug. 6, 2020

(65) Prior Publication Data
US 2022/0104095 A1  Mar. 31, 2022

(30) Foreign Application Priority Data

Jan. 31, 2019  (CN) .......................... 201910099039.6

(51) Int. Cl.
*H04W 36/00* (2009.01)
*H04W 36/26* (2009.01)

(52) U.S. Cl.
CPC ..... *H04W 36/26* (2013.01); *H04W 36/00835* (2018.08)

(58) Field of Classification Search
CPC .................. H04W 36/26; H04W 36/00835
See application file for complete search history.

(56) References Cited

U.S. PATENT DOCUMENTS

| | | | | |
|---|---|---|---|---|
| 2012/0135731 A1* | 5/2012 | Rangaiah | ............... | H04W 48/20 455/434 |
| 2018/0184475 A1* | 6/2018 | Babaei | .............. | H04W 72/1215 |

(Continued)

FOREIGN PATENT DOCUMENTS

| | | |
|---|---|---|
| CN | 102378192 A | 3/2012 |
| CN | 102421153 A | 4/2012 |

(Continued)

OTHER PUBLICATIONS

CMCC, "Discussion on NR-U cell selection/re-selection", 3GPP TSG-RAN WG2 Meeting #106, R2-1906465; May 13-17, 2019; 4 pages.

(Continued)

*Primary Examiner* — Shukri Taha
(74) *Attorney, Agent, or Firm* — CANTOR COLBURN LLP

(57) ABSTRACT

A method and device for triggering cell reselection, a storage medium, and a user terminal are provided. The method comprises: when a request to establish or resume an RRC connection is initiated, determining whether the number of consecutive LBT failures exceeds a preset threshold; and if the number of consecutive LBT failures exceeds the preset threshold, performing cell reselection in response.

16 Claims, 2 Drawing Sheets

(56) References Cited

U.S. PATENT DOCUMENTS

| | | | | |
|---|---|---|---|---|
| 2019/0124690 A1* | 4/2019 | Siomina | H04W 24/10 |
| 2020/0120673 A1* | 4/2020 | Chen | H04W 72/23 |
| 2021/0306921 A1* | 9/2021 | Niu | H04W 24/02 |
| 2021/0352555 A1* | 11/2021 | Fujishiro | H04W 36/22 |
| 2021/0392534 A1* | 12/2021 | Kim | H04W 48/18 |

FOREIGN PATENT DOCUMENTS

| | | | |
|---|---|---|---|
| CN | 108307460 A | 7/2018 |
| CN | 108347745 A | 7/2018 |
| CN | 109076373 A | 12/2018 |
| CN | 111385912 A | 7/2020 |
| WO | 2017178486 A1 | 10/2017 |
| WO | 2017193282 A1 | 11/2017 |

OTHER PUBLICATIONS

EPO Extended European Search Report for corresponding EP Application No. 20748085.6; Issued on Mar. 1, 2022.

Ericsson, "Mobility Framework in NR-U", 3GPP TSG-RAN WG2 NR#101-Bis, Tdoc R2-1805732; Apr. 16-20, 2018; 4 pages.

IPIN Office Action for corresponding IN Application No. 202117039045; Mail date of Mar. 23, 2022.

Mediatek Inc., "Cell Selection and Re-selection in NR-U", 3GPP TSG-RAN WG2 Meeting #105-Bis, Tdoc R2-1903045; Apr. 8-12, 2019; 4 pages.

Spreadtrum Communications, "Consideration of LBT failure in NR-U", 3GPP TSG-RAN WG2 Meeting #105, R2-1900937; Feb. 25-Mar. 1, 2019; 2 pages.

Spreadtrum Communications, "Discussion on LBT Failures in Non-Connected State", 3GPP TSG-RAN WG2 Meeting #107, R2-1909103; Aug. 26-30, 2019; 3 pages.

ZTE, "Considerations on channel access procedure for NR-U", 3GPP TSG RAN WG2 Nr #103 Meeting, R2-1811281; Aug. 20-24, 2018; 4 pages.

ZTE, "Considerations on mobility for NR-U", 3GPP TSG-RAN WG2 Nr AH1807 Meeting, R2-1809838; Jul. 2-6, 2018; 3 pages.

Hisilicon, H., "Cell selection and reselection rules", 3rd Generation Project, 3GPP TSG-RAN WG2 Meeting #100, R2-1713290, Reno, USA, Nov. 27-Dec. 1, 2017; 5 pages.

International Search Report for International Application No. PCT/JP2020/070858; Mailing Date: Mar. 26, 2020.

Qualcomm Incorporated, "Required functionality for support of LAA-LTE", 3rd Generation Partnership Project, 3GPP TSG-RAN WG2 Meeting #89, R2-150517, Athens, Greece, Feb. 9-13, 2015; 4 pages.

Samsung, "DRS design and LBT procedure", 3rd Generation Partnership Project, 3GPP TSG RAN WG1 Meeting #82, R1-154767, Beijing, China, Aug. 24-28, 2015; 7 pages.

Samsung, "On indicating LBT failure for NR-U", 3rd Generation Partnership Project, 3GPP TSG-RAN WG2#104, R2-1817934, Spokane, Washington, USA, Nov. 12-16; 1 page.

* cited by examiner

METHOD AND DEVICE FOR TRIGGERING CELL RESELECTION, STORAGE MEDIUM, AND USER TERMINAL

CROSS-REFERENCE TO RELATED APPLICATIONS

This is the U.S. national stage of International Application No. PCT/CN2020/070858, filed on Jan. 8, 2020. Priority under 35 U.S.C. § 119(a) and 35 U.S.C. § 365(b) is claimed from, Chinese Patent Application No. 201910099039.6, filed on Jan. 31, 2019, the disclosure of which is incorporated herein by reference.

TECHNICAL FIELD

The present disclosure generally relates to communication technology field, and more particularly, to a method and device for triggering cell reselection, a storage medium, and a user equipment.

BACKGROUND

The 3rd Generation Partnership Project (3GPP) standards organization will study how to deploy Fifth-Generation mobile communications (5G) New Radio (NR) systems on unlicensed spectrums, so as to achieve fair and effective use of unlicensed spectrums and increase a data transmission rate of the NR systems.

For the use of unlicensed spectrums, different countries have different control methods. For example, it is necessary to use the unlicensed spectrums in the manner of Listen-Before-Talk (LBT).

In the 5G NR communication systems, User Equipment (UE) state includes Radio Resource Control-Idle (RRC-IDLE) state, RRC-Inactive state and RRC-Connected state. When the UE enters the RRC-Connected state from the RRC-IDLE state, it needs to perform RRC connection setup, and when the UE enters the RRC-Connected state from the RRC-Inactive state, it needs to perform an RRC connection resume procedure. The UE can perform cell reselection in the RRC-IDLE state or the RRC-Inactive state, and reselect a more suitable cell, such as a cell with better signal quality or higher priority.

However, due to the sharing of unlicensed spectrums, consecutive LBT failures may occur. Specifically, if the number of consecutive LBT failures exceeds a preset threshold, or the number of consecutive LBT failures within a preset time period exceeds another preset threshold, it is called an LBT consecutive failure.

In existing techniques, when an LBT consecutive failure occurs, the UE may continue to try LBT or continue to try LBT after a period of time, which results in a large delay in sending information and affects communication quality.

SUMMARY

Embodiments of the present disclosure provide a method and device for triggering cell reselection, a storage medium, and a user equipment, which may enable cell reselection to be triggered timely, reduce a delay in sending information, and effectively improve communication quality.

In an embodiment of the present disclosure, a method for triggering cell reselection is provided, including: based on an RRC connection setup request or an RRC resume request being initiated, determining whether a number of consecutive LBT failures exceeds a preset threshold; and based on the number of consecutive LBT failures exceeding the preset threshold, performing cell reselection.

Optionally, said performing cell reselection includes: determining a set of target cells; sorting the target cells in the set; and selecting the target cells that are ranked first successively to perform cell reselection.

Optionally, said determining the set of target cells includes: determining cells whose cell selection reception level value and cell selection quality value are both greater than zero as the target cells.

Optionally, said sorting the target cells in the set includes: determining an R value of each target cell in the set; and sorting the target cells according to the R value, wherein the ranking of the target cell becomes higher as the R value increases.

Optionally, the R value of the target cell is determined based on following formula, $$R_n = Q_{meas,n} - Q_{offset} - Q_{offsettemp4},$$

where $R_n$ represents the R value of the target cell, $Q_{meas,n}$ represents a Reference Signal Receiving Power (RSRP) measurement value of the target cell, $Q_{offset}$ represents an offset value, and $Q_{offsettemp4}$ represents a fourth temporary offset.

Optionally, the cell selection reception level value and the cell selection quality value of the target cell are determined based on following formula, $$S_{rxlev} = P - X - Q_{offsettemp1},$$

$$S_{qual} = Q - Y - Q_{offsettemp2},$$

where $S_{rxlev}$ represents the cell selection reception level value, P represents a measured target cell selection reception level value, X represents a cell selection reception level value threshold, $Q_{offsettemp1}$ represents a first temporary offset, $S_{qual}$ represents the cell selection quality value, Q represents a measured cell selection quality value, Y represents a cell selection quality value threshold, and $Q_{offsettemp2}$ represents a second temporary offset.

Optionally, said determining the set of target cells includes: determining a frequency priority of each available cell; and determining the set of target cells based on the frequency priorities of the available cells.

Optionally, prior to said determining the frequency priority of each available cell, the method further includes: determining a first available cell based on a frequency where a current serving cell is located; and decreasing the frequency priority of the first available cell located on the frequency by a preset level.

Optionally, said determining the set of target cells based on the frequency priorities of the available cells includes: based on the frequency priorities from high to low, determining whether signal quality of the available cell exceeds preset quality within a preset time period, until it is determined that one or more second available cells whose signal quality exceeds the preset quality within the time period are located on one frequency priority; and determining the set of the target cells based on the one or more second available cells.

Optionally, said sorting the target cells in the set includes: determining an R value of each target cell in the set; and sorting the target cells according to the R value, wherein the ranking of the target cell becomes higher as the R value increases.

Optionally, the preset quality is determined based on following formula, $$\text{Thresh} = \text{Thresh}_x - Q_{\textit{offsettemp5}},$$

where Thresh represents the preset quality, $\text{Thresh}_x$ represents a threshold condition under which the target cell is determined as a candidate cell, and $Q_{\textit{offsettemp5}}$ represents a fifth temporary offset.

In an embodiment of the present disclosure, a device for triggering cell reselection is provided, including: a determining circuitry configured to: based on an RRC connection setup request or an RRC resume request being initiated, determine whether a number of consecutive LBT failures exceeds a preset threshold; and a reselecting circuitry configured to: based on the number of consecutive LBT failures exceeding the preset threshold, perform cell reselection.

In an embodiment of the present disclosure, a storage medium having computer instructions stored therein is provided, wherein when the computer instructions are executed, the above method for triggering cell reselection is performed.

In an embodiment of the present disclosure, a user equipment including a memory and a processor is provided, wherein the memory has computer instructions stored therein, and when the processor executes the computer instructions, the above method for triggering cell reselection is performed.

DETAILED DESCRIPTION

Figure 1:
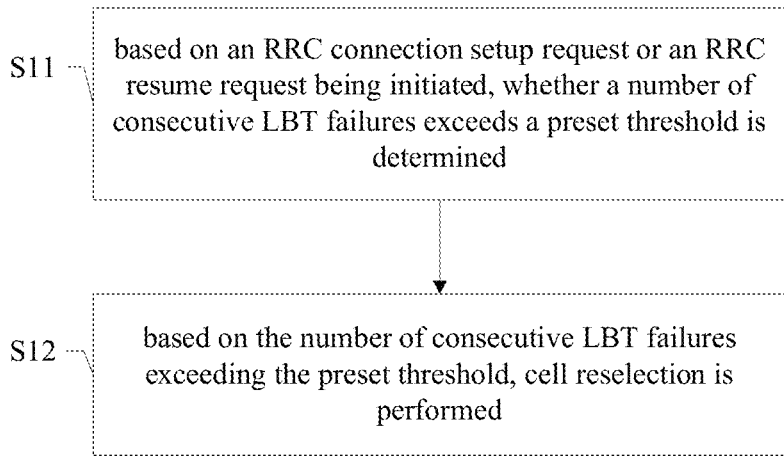
FIG. 1 is a flow chart of a method for triggering cell reselection according to an embodiment.

In the existing techniques, unlicensed spectrums are used in the LBT manner. The unlicensed spectrums being used by the NR system is also called New RAT Un-license (NR-U) technology.

Specifically, using LBT, Clear Channel Assessment (CCA) can be performed before communication between a sender and a receiver. If the assessment result is that the channel is idle, data is sent immediately; otherwise, data cannot be transmitted until the end of a next fixed frame period. The fixed frame is composed of a Channel Occupancy Time (COT) and an idle period, where the COT is from 1 millisecond (ms) to 10 ms, and a minimum idle period is 5% of the COT.

A threshold of the number of consecutive LBT failures and a time threshold may be configured on a network side, and may be notified to a terminal through a dedicated message or a public message. The dedicated message may use, for example, Radio Resource Control (RRC) signaling, and the public message may use, for example, System Information Block (SIB).

In specific implementations, the problem of LBT consecutive failure may occur. For example, if the network side configures the threshold of the number of consecutive LBT failures to 8, the LBT fails 8 times consecutively can be regarded as the LBT consecutive failure. It could be understood that a time threshold T1 and a number threshold can be set for consecutive LBT failures, for example, 10 s and 8 times, then the LBT failing 8 times consecutively within 10 s can be regarded as the occurrence of LBT consecutive failure.

The inventor has discovered through research that in the existing techniques, although there is a cell reselection function, the UE will not perform cell reselection when an LBT consecutive failure occurs, but will continue to try LBT or continue to try LBT after a certain period of time, which may result in a longer delay in sending information, and affect communication quality.

Specifically, in the existing techniques, cell reselection is applied based on the UE initiating RRC connection setup but failing. More specifically, a UE state includes Radio Resource Control-Idle (RRC-IDLE) state, RRC-Inactive state and RRC-Connected state. Based on the UE entering the RRC-Connected state from the RRC-IDLE state, it needs to perform RRC connection setup, and based on the UE entering the RRC-Connected state from the RRC-Inactive state, it needs to perform an RRC connection resume procedure. The UE can perform cell reselection in the RRC-IDLE state or the RRC-Inactive state, and reselect a more suitable cell, such as a cell with better signal quality or higher priority.

In embodiments of the present disclosure, based on an RRC connection setup request or an RRC resume request being initiated, whether a number of consecutive LBT failures exceeds a preset threshold is determined, and based on the number of consecutive LBT failures exceeding the preset threshold, cell reselection is performed. With the above embodiments, the cell reselection is configured to be performed in response to the number of consecutive LBT failures exceeding the preset threshold. Compared with the existing techniques where when LBT fails consecutively, a UE continues to try LBT or continues to try LBT after a period of time, resulting in large delay in sending information, in the embodiments of the present disclosure, cell reselection may be triggered in time, which helps to reduce delay in sending information and effectively improve communication quality.

In order to clarify the objects, characteristics and advantages of the disclosure, embodiments of present disclosure will be described in detail in conjunction with accompanying drawings.

Referring to FIG. 1, FIG. 1 is a flow chart of a method for triggering cell reselection according to an embodiment. The method may be applied at a UE side, and may include S11 and S12.

In S11, based on an RRC connection setup request or an RRC resume request being initiated, whether a number of consecutive LBT failures exceeds a preset threshold is determined.

In S12, based on the number of consecutive LBT failures exceeding the preset threshold, cell reselection is performed.

In some embodiments, in S11, the UE in the RRC-IDLE state or the RRC-Inactive state initiates an RRC Setup Request in a current serving cell, for example, based on the UE in the RRC-IDLE state initiating a procedure of sending an RRC Setup Request message to a network side, or based on the UE in the RRC-Inactive state initiating a procedure of sending an RRC Resume Request to the network side, based on consecutive LBT failures occurring, a number of consecutive LBT failures is counted to determine whether an LBT consecutive failure event has occurred.

In some embodiments, based on the number of consecutive LBT failures exceeding a predetermined threshold, it is determined that an LBT consecutive failure event has occurred. The predetermined threshold may be sent to the UE from the network side, or may be predefined by a protocol.

In some embodiments, in S12, based on the number of consecutive LBT failures exceeding the preset threshold, cell reselection is performed.

In the above embodiments, the cell reselection is configured to be performed in response to the number of consecutive LBT failures exceeding the preset threshold. Compared with the existing techniques where when LBT fails consecutively, a UE continues to try LBT or continues to try LBT after a period of time, resulting in large delay in sending information, in the embodiments of the present disclosure, cell reselection may be triggered in time, which helps to reduce delay in sending information and effectively improve communication quality.

Figure 2:
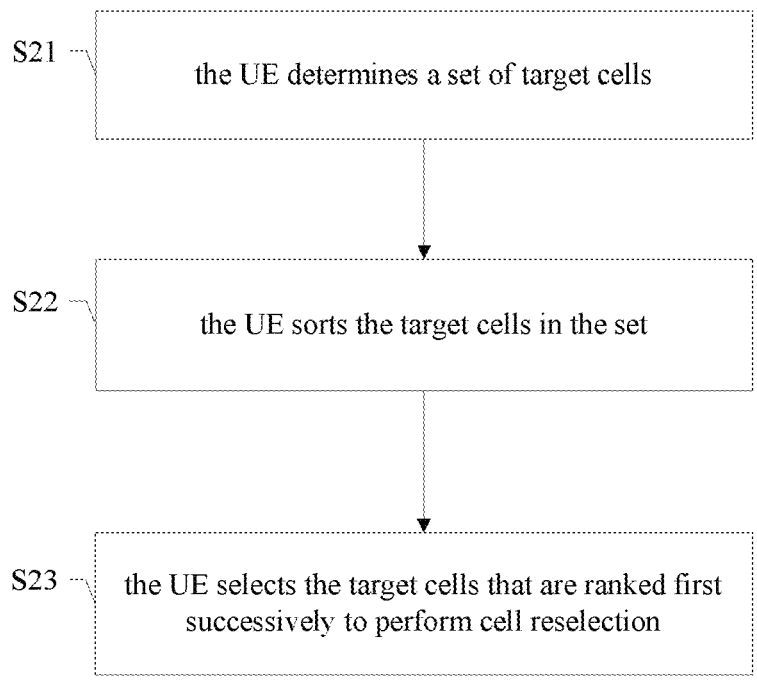
FIG. 2 is a flow chart of S12 as shown in FIG. 1 according to an embodiment.

Referring to FIG. 2, FIG. 2 is a flow chart of S12 as shown in FIG. 1 according to an embodiment. The step of performing cell reselection may include S21 to S23 which are described in detail below.

In S21, the UE determines a set of target cells.

Specifically, the target cell may be a cell that helps to improve communication quality after reselection, for example, a cell with better signal quality or a cell with higher priority.

In some embodiments, the target cells may be intra-frequency cells or cells with the same frequency priority.

In some embodiments, said determining the set of target cells includes: determining cells whose cell selection reception level value and cell selection quality value are both greater than zero as the target cells.

In some embodiments, the cell selection reception level value and the cell selection quality value of the target cell are determined based on following formula, $$S_{rxlev} = P - X - Q_{offsettemp1},$$

$$S_{qual} = Q - Y - Q_{offsettemp2},$$

where $S_{rxlev}$ represents the cell selection reception level value, P represents a measured target cell selection reception level value, X represents a cell selection reception level value threshold, $Q_{offsettemp1}$ represents a first temporary offset, $S_{qual}$ represents the cell selection quality value, Q represents a measured cell selection quality value, Y represents a cell selection quality value threshold, and $Q_{offsettemp2}$ represents a second temporary offset.

$Q_{offsettemp1}$ and $Q_{offsettemp2}$ may be configured by the network side for the UE, so that the cell selection reception level value and the cell selection quality value of each target cell can be flexibly adjusted by setting $Q_{offsettemp1}$ and $Q_{offsettemp2}$, which enables the UE to select a more appropriate target cell during reselection. Further, by setting relatively large $Q_{offsettemp1}$ and $Q_{offsettemp2}$ for the current serving cell, it helps to increase difficulty for the UE to choose to camp on the current serving cell, thereby reducing probability of the UE failing to set up an RRC connection in the current serving cell.

In the embodiments of the present disclosure, in the case of intra-frequency cells or inter-frequency cells with the same priority, cells whose cell selection reception level value and cell selection quality value are both greater than zero may be determined as the set of the target cells, which helps to determine signal quality of the target cells so as to further improve accuracy of determining the appropriate cell.

In S22, the UE sorts the target cells in the set.

In some embodiments, said sorting the target cells in the set includes: determining an R value of each target cell in the set; and sorting the target cells according to the R value, wherein the ranking of the target cell becomes higher R value increases.

In some embodiments, the R value of the target cell is determined based on following formula, $$R_n = Q_{meas,n} - Q_{offset} - Q_{offsettemp4},$$

where $R_n$ represents the R value of the target cell, $Q_{meas,n}$ represents an RSRP measurement value of the target cell, $Q_{offset}$ represents an offset value, and $Q_{offsettemp4}$ represents a fourth temporary offset.

$Q_{offsettemp4}$ may be configured by the network side for the UE, so that the R value of each target cell can be flexibly adjusted by setting $Q_{offsettemp4}$, which enables the UE to select a more appropriate target cell during reselection.

In S23, the UE selects the target cells that are ranked first successively to perform cell reselection.

In the embodiments of the present disclosure, by determining the set of target cells and sorting the target cells in the set, an appropriate cell can be determined for cell reselection, thereby increasing a success rate of cell reselection, and further successfully initiating an RRC connection setup request or an RRC resume request.

In some embodiments, the target cells may be inter-frequency cells or inter-system cells, where different frequencies have different priorities.

Still referring to FIG. 2, in S21, the UE determines the set of target cells.

In some embodiments, said determining the set of target cells includes: determining a frequency priority of each available cell; and determining the set of target cells based on the frequency priorities of the available cells. The available cell is configured to be used for cell reselection.

Figure 3:
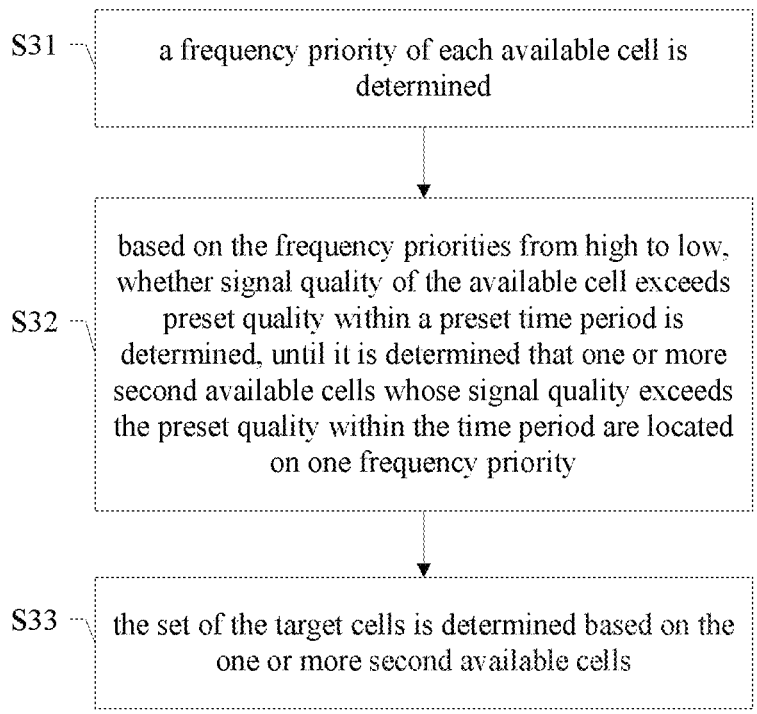
FIG. 3 is a flow chart of S21 as shown in FIG. 2 according to an embodiment.

Referring to FIG. 3, FIG. 3 is a flow chart of S21 as shown in FIG. 2 according to an embodiment. The step of determining the set of target cells includes S31 to S33 which are described in detail below.

In S31, a frequency priority of each available cell is determined.

In some embodiments, as the available cells are inter-frequency cells or inter-system cells, they may have different frequency priorities.

In S32, based on the frequency priorities from high to low, whether signal quality of the available cell exceeds preset quality within a preset time period is determined, until it is determined that one or more second available cells whose signal quality exceeds the preset quality within the time period are located on one frequency priority.

As cells with high frequency priority generally have better communication quality, it is likely to determine a cell with high quality as a reselected cell based on the order of the frequency priority from high to low.

In some embodiments, the preset quality is determined based on following formula, $$\text{Thresh} = \text{Thresh}_x - Q_{offsettemp5},$$

where Thresh represents the preset quality, $\text{Thresh}_x$ represents a threshold condition under which the target cell is determined as a candidate cell, and $Q_{offsettemp5}$ represents a fifth temporary offset.

In some embodiments, whether a cell can be determined as a candidate cell may be determined based on a variety of parameters, for example, using Reference Signal Receiving Power (RSRP) or Reference Signal Receiving Quality (RSRQ) and other parameters, then $\text{Thresh}_x$ is a threshold of RSRP or RSRQ.

$Q_{offsettemp5}$ may be configured by the network side for the UE, so that the preset quality each target cell needs to satisfy can be flexibly adjusted by setting $Q_{offsettemp5}$, which enables the UE to select a more appropriate target cell during reselection.

In S33, the set of the target cells is determined based on the one or more second available cells.

In some embodiments, the second available cells may be one or more second available cells with a same frequency priority.

In the embodiments of the present disclosure, a frequency priority can be determined based on the order of the frequency priority from high to low, where signal quality of at least one cell at this frequency priority exceeds the preset quality within the preset time period, and accordingly the at least one cell meets reselection requirements.

Still referring to FIG. 2, in S22, the UE sorts the target cells in the set.

In some embodiments, said sorting the target cells in the set includes: determining an R value of each target cell in the set; and sorting the target cells according to the R value, wherein the ranking of the target cell becomes higher as the R value increases.

In some embodiments, the R value of the target cell is determined based on following formula, $$R_n = Q_{meas,n} - Q_{offset} - Q_{offsettemp4},$$

where $R_n$ represents the R value of the target cell, $Q_{meas,n}$ represents an RSRP measurement value of the target cell, $Q_{offset}$ represents an offset value, and $Q_{offsettemp4}$ represents a fourth temporary offset.

$Q_{offsettemp4}$ may be configured by the network side for the UE, so that the R value of each target cell can be flexibly adjusted by setting $Q_{offsettemp4}$, which enables the UE to select a more appropriate target cell during reselection.

In S23, the UE selects the target cells that are ranked first successively to perform cell reselection.

In the embodiments of the present disclosure, in the case of inter-frequency or inter-system cells, the frequency priority of each available cell may be determined, and the set of target cells may be determined based on the frequency priorities of the available cells. Therefore, the target cells with relatively high frequency priority may be selected. As high-priority cells tend to have higher communication quality, the accuracy of determining the appropriate cell may be further improved.

In the embodiments of the present disclosure, by determining the set of target cells and sorting the target cells in the set, an appropriate cell can be determined for cell reselection, thereby increasing a success rate of cell reselection, and further successfully initiating an RRC connection setup request or an RRC resume request.

In the embodiments of the present disclosure, in the case of inter-frequency or inter-system cells, based on the number of consecutive LBT failures exceeding a preset threshold, the frequency priority of a first available cell may be reduced by a preset level.

In some embodiments, during cell selection and cell reselection, the UE may obtain absolute priorities of different frequencies or Radio Access Technologies (RAT) through system information or RRC signaling, or inherit an absolute priority configured in an original RAT based on the UE being selected to NR from the original RAT.

Prior to said determining the frequency priority of each available cell, the method further includes: determining a first available cell based on a frequency where a current serving cell is located; and decreasing the frequency priority of the first available cell located on the frequency by a preset level.

In some embodiments, the available cells on frequencies of all unlicensed spectrums may serve as the first available cell. In some embodiments, based on the current serving cell having consecutive LBT failures, the available cell located on the same frequency as the current serving cell may also be prone to have consecutive LBT failures, and thus it is not recommended to select this type of cell (i.e., the first available cell) as the reselected cell.

In the embodiments of the present disclosure, in the case of inter-frequency or inter-system cells, different frequencies have different priorities. Based on the number of consecutive LBT failures exceeding the preset threshold, the frequency priority of the first available cell may be reduced by the preset level. Therefore, based on the second available cell being determined according to the order of the frequency priority subsequently, it is not prone to select other available cells on the frequency where the current serving cell is located, which helps to further improve the accuracy of determining the appropriate cell.

$Q_{offsettemp6}$ may be used to represent the preset level and referred to as a sixth temporary offset.

In some embodiments, an effective duration T2 may be set for $Q_{offsettemp6}$, so that the first available cell can be downgraded only within a certain time period to avoid impact of long-term downgrade. For T2, timing may start from the occurrence of N consecutive LBT failures, or from the UE initiating cell selection or cell reselection.

In some embodiments, based on the number of consecutive LBT failures in multiple cells on a same frequency exceeding a preset threshold, the frequency priority of the first available cell is lowered by a preset level. Specifically, the number of consecutive LBT failures in multiple cells on the same frequency exceeding the preset threshold means that the number M of consecutive LBT failures in multiple cells on the same frequency exceeding the preset threshold, where M is configured by the network side.

Figure 4:
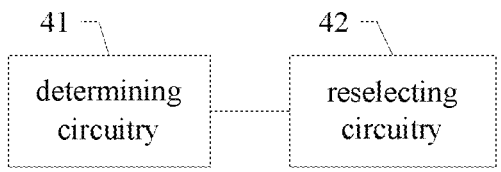
FIG. 4 is a structural diagram of a device for triggering cell reselection according to an embodiment.

Referring to FIG. 4, FIG. 4 is a structural diagram of a device for triggering cell reselection according to an embodiment. The device includes: a determining circuitry 41 configured to: based on an RRC connection setup request or an RRC resume request being initiated, determine whether a number of consecutive LBT failures exceeds a preset threshold; and a reselecting circuitry 42 configured to:

based on the number of consecutive LBT failures exceeding the preset threshold, perform cell reselection.

With the above embodiments, the cell reselection is configured to be performed in response to the number of consecutive LBT failures exceeding the preset threshold. Compared with the existing techniques where when LBT fails consecutively, a UE continues to try LBT or continues to try LBT after a period of time, resulting in large delay in sending information, in the embodiments of the present disclosure, cell reselection may be triggered in time, which helps to reduce delay in sending information and effectively improve communication quality.

In an embodiment of the present disclosure, a storage medium having computer instructions stored therein is provided, wherein when the computer instructions are executed, any one of the above methods is performed. In some embodiments, the storage medium may be a computer readable storage medium, and may include a non-volatile or a non-transitory memory, or include an optical disk, a magnetic disk or a solid state disk.

In an embodiment of the present disclosure, a UE including a memory and a processor is provided, wherein the memory has computer instructions stored therein, and when the processor executes the computer instructions, any one of the above methods is performed. The UE may include but not limited to terminal devices such as mobile phones, computers or tablets.

It could be understood that the embodiments of the present disclosure are applicable to 5G NR communication systems, 4G and 3G communication systems, and various new communication systems in the future, such as 6G and 7G. The embodiments of the present disclosure are also applicable to different network architectures, including but not limited to relay network architecture, dual link architecture, Vehicle-to-Everything and V2X.

The network side in the embodiments of the present disclosure may include a core network equipment, where the core network may be an Evolved Packet Core (EPC), 5G Core Network or a new core network in future communication systems. The 5G Core Network is composed of a set of devices, implements Access and Mobility Management Function (AMF) providing functions such as mobility management function, User Plane Function (UPF) providing functions such as packet routing and forwarding and Quality of Service (QoS) management, and Session Management Function (SMF) providing functions such as session management and IP address allocation and management. EPC can be composed of MME that provides functions such as mobility management and gateway selection, Serving Gateway (S-GW) that provides functions such as data packet forwarding, and PDN Gateway (P-GW) that provides functions such as terminal address allocation and rate control.

The network side in the embodiments of the present disclosure may be a Base Station (BS) of a radio access network. The base station may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

The network side in the embodiments of the present disclosure may include a base station controller of a radio access network, which is a device for managing base stations, such as a base station controller (BSC) in a 2G network, a radio network controller (RNC) in a 3G network, or a device that controls and manages base stations in a new communication system in the future.

A terminal in the embodiments of the present disclosure may refer to various forms of User Equipment (UE), access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for triggering cell reselection, comprising:
   based on a Radio Resource Control (RRC) connection setup request or an RRC resume request being initiated, determining whether a number of consecutive Listen-Before-Talk (LBT) failures exceeds a preset threshold; and
   based, on the number of consecutive LET failures exceeding the preset threshold, performing cell reselection, wherein said performing cell reselection comprises determining a set of target cells;
   wherein said determining the set of target cells comprises:
      determining a frequency priority of each candidate cell; and
      determining the set of target cells based on the frequency priorities of the candidate cells;
   wherein prior to said determining the frequency priority of each candidate cell, the method further comprises:
      determining a first candidate cell based on a frequency where a current serving cell is located; and
      decreasing the frequency priority of the first candidate cell located on the frequency by a preset level.

2. The method according to claim 1, wherein said performing cell reselecticn further comprises:
   sorting the target cells in the set; and
   selecting the target cells that are ranked first successively to perform cell reselection.

3. The method according to claim 1, wherein said determining the set of target cells comprises:
   determining cells whose cell selection reception level value and cell selection quality value are both greater than zero as the target cells.

4. The method according to claim 3, wherein said sorting the target cells in the set comprises:
   determining an R value of each target cell in the set; and
   sorting the target cells according to the R value,
   wherein the ranking of the target cell becomes higher as the R value increases.

5. The method according to claim 4, wherein, the R value of the target, cell is determined based on following formula, $$R_n = Q_{meas,n} - Q_{offset} - Q_{offsettemp4},$$

where $R_n$ represents the R value of the target cell, $Q_{means,n}$ represents a Reference Signal Receiving Power (RSRP) measurement value of the target cell, $Q_{offset}$ represents an offset value, and $Q_{offsettemp4}$ represents a fourth temporary ottset.

6. The method according to claim 3, wherein the cell selection reception level value and the cell selection quality value of the target cell are determined based on following formula, $$S_{rslev} = P - X - Q_{offsettemp\,1},$$

$$S_{qual} = Q - Y - Q_{offsettemp\,2},$$

where $S_{rxlev}$ represents the cell selection reception level value, P represents a measured target cell selection reception level value, X represents a cell selection reception level value threshold, $Q_{offsettemp2}$ represents a first temporary offset, $S_{qual}$ represents the cell selection quality value, Q represents a measured cell selection quality value) Y represents a cell selection quality value threshold, and $Q_{offsettemp2}$ represents a second temporary offset.

7. The method according to claim 1, wherein said determining the set of target cells based on the frequency priorities of the available cells comprises:
based on the frequency priorities from high to low, determining whether signal quality of the available cell exceeds preset quality within a preset time period, until it is determined that one or more second available cells whose signal quality exceeds the preset quality within the time period are located on one frequency priority; and
determining the set of the target cells based on the one or more second available cells.

8. The method according to claim 7, wherein said sorting the target cells in the set comprises:
determining an R value of each target cell in the set; and
sorting the target cells according to the R value,
wherein the ranking of the target cell becomes higher as the R value increases.

9. The method according to claim 7, wherein the preset quality is determined based on following formula, $$\text{Thresh} = \text{Thresh}_x - Q_{offsettemp\,5},$$

where Thresh represents the preset quality, $\text{Thresh}_x$ represents a threshold condition under which the target cell is determined as a candidate cell, and $Q_{offsettemp5}$ represents a fifth temporary offset.

10. A device for triggering cell reselection, comprising:
a determining circuitry configured to: based on a Radio Resource Control (RRC) connection setup request or an RRC resume request being initiated, determine whether a number of consecutive Listen-Before-Talk (LBT) failures exceeds a preset threshold; and
a reselecting circuitry configured to: based on the number of consecutive LBT failures exceeding the preset threshold, perform cell reselection, wherein said performing cell reselection comprises determining a set of target cells;
wherein said determining the set of target cells comprises:
determining a frequency priority of each candidate cell; and
determining the set of target cells based on the frequency priorities of the candidate cells;
wherein prior to said determining the frequency priority of each candidate cell, the method further comprises:
determining a first candidate cell based on a frequency where a current serving cell is located; and
decreasing the frequency priority of the first candidate cell located on the frequency by a preset level.

11. A non-transitory storage medium storing one or more programs, the one or more programs comprising computer instructions, which, when executed by a processor, cause the processor to:
based on an RRC connection setup request or an RRC resume request being initiated, determine whether a number of consecutive LET failures exceeds a preset threshold; and
based on the number of consecutive LBT failures exceeding the preset threshold, perform cell reselection, wherein said performing cell reselection comprises determining a set of target cells;
wherein said determining the set of target cells comprises:
determining a frequency priority of each candidate cell; and
determining the set of target cells based on the frequency priorities of the candidate cells;
wherein prior to said determining the frequency priority of each candidate cell, the method further comprises:
determining a first candidate cell based on a frequency where a current serving cell is located; and
decreasing the frequency priority of the first candidate cell located on the frequency by a preset level.

12. The non-transitory storage medium according to claim 11, wherein said performing cell reselection further comprises:
sorting the target cells in the set; and
selecting the target cells that are ranked first successively to perform cell reselection.

13. The non-transitory storage medium according to claim 11, wherein said determining the set of target cells comprises:
determining cells whose cell selection reception level value and cell selection quality value are both greater than zero as the target cells.

14. The non-transitory storage medium according to claim 11, wherein said sorting the target cells in the set comprises:
determining an R value of each target cell in the set; and
sorting the target cells according to the R value,
wherein the ranking of the target cell becomes higher as the R value increases.

15. The non-transitory storage medium according to claim 11, wherein said determining the set of target cells based on the frequency priorities of the available cells comprises:
based on the frequency priorities from high to low, determining whether signal quality of the available cell exceeds preset quality within a preset time period, until it is determined that one or more second available cells whose signal quality exceeds the preset quality within the time period are located on one frequency priority; and
determining the set of the target cells based on the one or more second available cells.

16. The non-transitory storage medium according to claim 15, wherein said sorting the target cells in the set comprises:
determining an R value of each target cell in the set; and
sorting the target cells according to the R value, wherein the ranking of the target cell becomes higher as the R value increases.

* * * * *